COLOR TELEVISION SYSTEM

Filed June 8, 1954

INVENTOR.
PETER C. GOLDMARK
BY
Campbell, Brumbaugh, Free & Graves
ATTORNEYS

United States Patent Office 2,829,195

Patented Apr. 1, 1958

2,829,195

COLOR TELEVISION SYSTEM

Peter C. Goldmark, New York, N. Y., assignor to Columbia Broadcasting System, Inc., New York, N. Y., a corporation of New York Application June 8, 1954, Serial No. 435,296

12 Claims. (Cl. 178—5.4)

The present invention relates to color television, and, more particularly, to novel color television means for selectively transmitting either motion picture or live program material in color.

The applicant's copending U. S. application Serial No. 375,219, filed August 19, 1953, for "Color Television," discloses a color television system that has been found to be highly suitable for the transmission of color television signals in accordance with the current N. T. S. C. (National Television System Committee) standards. Briefly, it comprises a modified black and white television camera which is adapted to scan sequentially color separations of an object to be televised. In one embodiment, the signals corresponding to the scanning of the red and blue color separations are fed sequentially to two channels, respectively, and predetermined amounts of the signals corresponding to the scanning of the three color separations are combined in the proper proportions to produce white and are fed to a third channel. In each of the three channels is a conventional picture tube on the face of which is formed a monochrome image in response to the video signal therein. The images formed on the three picture tubes are scanned by three camera tubes, respectively, the outputs of which are combined as required to produce a suitable color signal for transmission to color receiver means.

It is an object of the invention to provide a novel and improved color television system of the above character having means whereby either live or motion picture film program material in color may be transmitted as desired.

In accordance with the invention, means are provided in a color television system of the above character enabling the camera tubes in the three channels to scan selectively either the images formed on the corresponding picture tubes, respectively, produced by the scanning of live program material by the first camera tube, or three color separation images of a motion picture film in color. The latter color separation images may be provided by suitable film projector means cooperating with beam-splitter means or the like, for example, for this purpose.

For a more complete understanding of the invention, reference may be had to the following detailed description of several representative embodiments, taken in conjunction with the accompanying figures of the drawing, in which.

Figure 1:
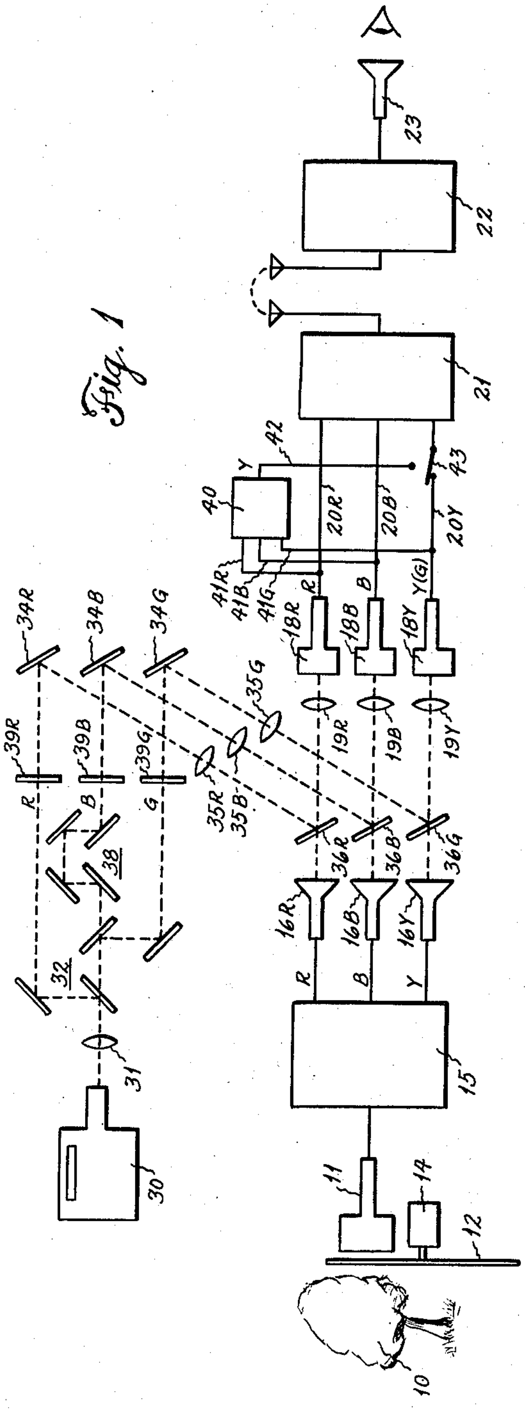
Figure 1 is a schematic block diagram of a color television system constructed in accordance with the invention.

In the system of Fig. 1, an object 10 is viewed by a camera tube 11 scanning through a color sectored disc 12. The color sectored disc 12 may be driven by suitable power means 14 operating in synchronism with the field scanning operation of the camera tube 11. The video signal produced in the camera tube 11 is a double-interlaced, field sequential signal. The control circuit means 15, which may take any suitable form, separates the video signal from the camera tube 11 into R (red), B (blue), and Y components, the Y component being a composite of the R (red), B (blue), and G (green) components of the video signal, in accordance with the N. T. S. C. standards. The R, B, and Y components are respectively fed sequentially to suitable pictures tubes or kinescopes 16R, 16B, and 16Y.

A plurality of camera tubes 18R, 18B, and 18Y are positioned opposite the screens of the kinescopes 16R, 16B, and 16Y and are adapted to scan simultaneously, through respective optical means 19R, 19B and 19Y, the images produced on the kinescope screens. The optical means 19R, 19B, and 19Y may take any suitable form. The camera tubes 18R, 18B, and 18Y may be connected by their respective conductor means 20R, 20B, and 20Y to suitable transmission circuit means 21, wherein the R, B, and Y components are utilized to form a composite color video signal. The composite video signal may be transmitted via radio, or other suitable media, to conventional home receiver means 22, for example, which controls the formation of a color picture image on the screen of a color picture tube 23. For a more detailed description of a system of this type, reference may be had to the aforementioned copending application.

For the transmission of color motion picture film program material, a conventional motion picture projector 30 may be provided which projects a light beam through optical means 31 of suitable form to light-splitting means 32, which may include a conventional array of dichroic mirrors. The projector 30 should be properly synchronized with the field scanning rates of the camera tubes 18R, 18B and 18Y so that four film frames will be scanned in five scanning frames in the known manner. The dichroic mirrors of the light-splitting means 32 cause the light beam from the motion picture projector 30 to be divided into its primary color components of R (red), B (blue), and G (green). The R, B, and G components may then be respectively reflected by means of suitable mirrors 34R, 34B, and 34G, and respectively focused by suitable optical means 35R, 35B, and 35G upon partially reflecting mirrors 36R, 36B, and 36G. The partially reflecting mirrors 36R, 36B, and 36G may be conventional half silvered mirrors which will act primarily to reflect light under certain conditions, in the manner of a conventional mirror, and to transmit light, under other conditions, in the manner of a transparent medium.

The partially reflecting mirrors 36R, 36B, and 36G are respectively positioned in the optical paths between the cooperatively associated kinescopes 16R, 16B, and 16Y, and the camera tubes 18R, 18B, and 18Y. Hence, when the camera tube 11 is scanning a live object 10 and the projector 30 is not operating, the camera tubes 18R, 18B and 18Y scan the images on the faces of the picture tubes 16R, 16B and 16Y, respectively, which are visible through the half silvered mirrors 36R, 36B and 36G, respectively. On the other hand, when color motion picture film is being projected by the projector 30 and the camera tube 11 is not operating, the camera tubes 18R, 18B and 18Y scan virtual images of the three color separations of the color film, respectively.

Desirably, the optical paths for the R, B, and G component light beams from the color picture projected by the motion picture projector 30 should be of equal length. To this end, optical path adjusting means 38, such as a plurality of mirrors disposed as shown in the figure, may be inserted in the optical path of the B component, intermediate the light-splitting means 32 and the mirror 34B.

When only live program material is being transmitted, the images on the screens of the kinescopes 16R, 16B, and 16Y are monochromatic, i. e., black and white. On the other hand, while the virtual images in the partially reflecting mirrors 36R, 36B, and 36G, during the transmission of motion picture material alone, are each monochromatic, they are of relatively different monochromes, i. e., red, blue, and green, respectively. Accordingly, compensation may be required for any undesirable spectral response in the camera tubes 18R, 18B and 18Y or elsewhere in the optical path. This may be accomplished by the insertion of suitable light intensity regulating means having suitable light transmission properties, such as the light transmission filters 39R, 39B, and 39G, in the respective optical paths of the R, B, and G component beams from the motion picture projector 30. While the transmission filters 39R, 39B, and 39G are shown as being positioned intermediate the light-splitting means 32 and the mirrors 34R, 34B, and 34G, respectively, it will be evident that they might also be positioned at other points in the system. For example, the transmission filter 39R might be positioned intermediate the mirror 34R and the partially reflecting mirror 36R.

During the transmission of live program material, it will be recalled that the images upon the screens of the kinescopes 16R, 16B, and 16Y are representative, respectively, of the R, B, and Y components of the video signal from the camera tube 11. However, when the motion picture program material is used, the virtual images in the partially reflecting mirrors 36R, 36B, and 36G are representative of the R, B, and G components. Since the composite color video signal transmitted by the transmitting circuits 21 is formed from the R, B, and Y components, it is necessary that the R, B, and G components of the motion picture program material be translated into R, B, and Y components. Accordingly, since the Y component is an additive composite of the R, B, and G components in the proportions set forth in the N. T. S. C. standards, the Y component may be developed by suitable electrical matrix means 40, which may be coupled to the outputs of the camera tubes 18R, 18B, and 18Y through the conductors 41R, 41B, and 41G, respectively.

The Y component output of the matrix 40 at the conductor 42 and the direct output of the camera tube 18Y at the conductor 20Y may be selectively coupled to the transmitter control circuits 21 by switch means 43, such as a conventional single-pole-double-throw switch. Thus, when live program material is being scanned by the camera tube 11, the Y component is directly obtained from the camera tube 18Y, and, when the motion picture program material is used, the Y component is obtained from the matrix 40.

Figure 2:
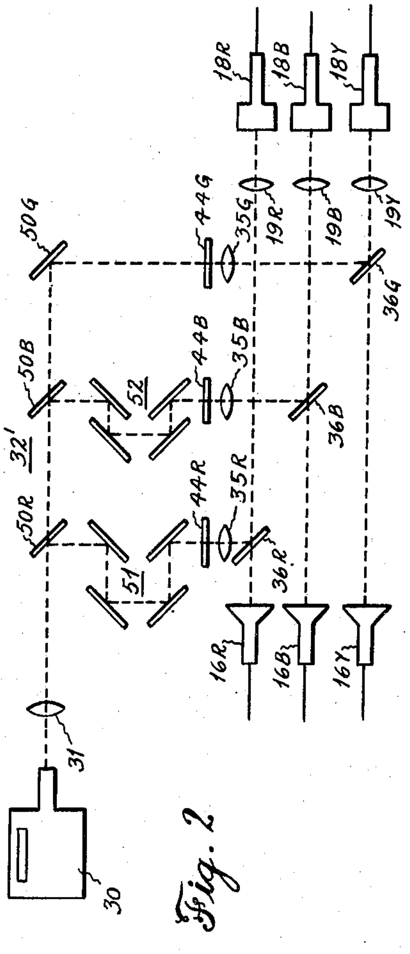
Fig. 2 is a schematic block diagram of an alternate optical system for projecting the color components from the motion picture film into the transmitter.

The alternate optical system of Fig. 2 may comprise a different light-splitting means 32' including three half-silvered mirrors 50R, 50B, and 50G placed successively in the direct optical path of the light from the motion picture projector 30 focused through the optical means 31. The mirror 50R transmits part of the light from the motion picture projector 30 to the mirrors 50B and 50G and reflects part of the light through a red filter 44R to the partially reflecting mirror 36R, forming a virtual red image on the latter. The mirror 50B transmits part of the light it receives to the mirror 50G and reflects part of the light through a blue filter 44B to the partially reflecting mirror 36B, forming a virtual blue image on the latter. The mirror 50G reflects the light it receives through a green filter 44G to the partially reflecting mirror 36G, forming a green virtual image thereon. Suitable optical path elongating means 51 and 52 may be inserted in the optical paths of the red and blue components in order to equalize the overall optical paths for all three of the components.

Figure 3:
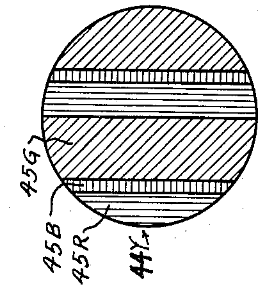
Fig. 3 is a front view of a filter that may be used to derive a Y optical beam for the apparatus shown in Fig. 2.

If desired, the Y signal for the picture from the motion picture projector 30 may be derived directly by combining the R, B, and G components in the proper proportion prior to projection upon the partially reflecting mirror 36G. This might be accomplished in Fig. 2, for example, by substituting for the green filter 44G, a Y filter 44Y as shown in Fig. 3. The filter 44Y may be formed with a plurality of adjacent red, blue and green filter areas 45R, 45B and 45G, respectively, in the proportions 0.3:0.11:0.59 corresponding to the ratios of red, blue and green required to form a Y signal in accordance with the current N. T. S. C. standards. Where such a filter is used, the Y matrix 40 (Fig. 1) may not be necessary.

The invention thus provides novel and improved color television means which is capable of transmitting either live program material or motion pictures in color as desired, in a simple and highly effective manner.

The several specific embodiments described above are meant to be merely exemplary and they are obviously susceptible of modification and variation within the scope of the invention. For example, the gains of the camera tubes 18R, 18B, and 18G may be regulated to compensate for any undesired spectral characteristic in the portion of the system employed for transmitting motion pictures in color. Therefore, the invention is not to be limited to the embodiments disclosed and its scope is defined in the appended claims.

I claim:

1. A television system comprising a first video link including scanning means for scanning an object to produce a video signal representative of said object and image producing means for producing a first visual image under the control of said video signal, picture projecting means for producing an optical signal representative of a picture recorded on film, an optical system for producing a second image in response to said optical signal, a second video link including a second scanning means, and second optical means arranged to view said first and second images for focussing the same on said second scanning means for scanning thereby.

2. A color television system, comprising a first video link including a scanning means for scanning an object to produce a video signal having a plurality of color components and a plurality of image producing means for respectively producing images representative of different color components in response to said video signal; picture projecting means for producing an optical signal having a plurality of color components; optical means for producing a plurality of different images representative respectively of different ones of said plurality of color components in said optical signal produced by said picture projecting means; a second video link including a plurality of scanning means for respectively scanning images representative of different color components to produce color component video signals, means to form a composite color video signal from said color component video signals produced by said plurality of scanning means, and means for producing a color image in response to said composite video signal; and means whereby said plurality of scanning means are adapted to scan selectively the images of said plurality of image producing means or the images of said optical means.

3. A color television system, comprising a first video link including scanning means adapted to produce a video signal representative of the primary color components in an object scanned in a field sequential manner, means for separating said primary color components of said video signal, and a plurality of means for respectively producing images representative of said separated color components; picture projection means for producing an optical signal having a plurality of primary color components, light-splitting means for causing said optical signal to be separated into a plurality of optical signals representative respectively of said primary color components in said optical signal produced by said picture projecting means, and optical means responsive respectively to different ones of said plurality of optical signals for producing images; a second video link having a plurality of scanning means corresponding in number to the plurality of image producing means in said first video link to produce color component video signals, means for producing a composite color video signal in response to the color component video signals produced by said plurality of scanning means, and image producing means for producing a color picture image in response to said composite color video signal; and means for selectively causing said plurality of scanning means to scan different ones of the images produced by said plurality of image producing means in said first video link or different ones of the images produced in response to said plurality of optical signals.

4. A color television system, comprising a first video link including a scanning means adapted to produce a video signal representative of the primary color components in an object scanned in a field sequential manner, means for separating said primary color components of said video signal, and a plurality of means for respectively producing images representative of said separated color components; picture projection means for producing an optical signal having a plurality of primary color components, light-splitting means for causing said optical signal to be separated into a plurality of optical signals representative respectively of said primary color components in said optical signal produced by said picture projecting means, optical means responsive respectively to different ones of said plurality of optical signals for producing images, and means for causing the optical paths of each of said plurality of optical signals to be of substantially the same length; a second video link having a plurality of scanning means corresponding in number to the plurality of image producing means in said first video link to produce color component video signals, means for producing a composite color video signal in response to the color component video signals produced by said plurality of scanning means, and image producing means for producing a color picture image in response to said composite color video signal; and means for selectively causing said plurality of scanning means to respectively scan different ones of the images produced by said plurality of image producing means in said first video link or different ones of the images produced in response to said plurality of optical signals.

5. A color television system, comprising a first video link including a scanning means for scanning an object to produce a video signal having three components representative respectively of three primary colors, means for producing a first and a second video signal responsive respectively to two of said video signal components, means for producing a third video signal representaive of a first additive mixture of said three color components of said video signal, and a plurality of image producing means for respectively producing images in response to said first, second and third video signals; picture projecting means adapted to produce an optical color signal, light-splitting means for producing three optical signals representative, respectively, of the color information present in said optical signal produced in said picture projecting means corresponding to said three primary color components of said video signal produced by said scanning means in said first video link, and optical means for producing images in response to respective ones of said three optical signals; a second video link including three scanning means for respectively producing video signals, means for producing a composite color video signal from said respective video signals produced by said three scanning means, and means for producing a color picture image in response to said composite color video signal; and means whereby each of said three scanning means is selectively adapted to scan the image of a different one of said first, second and third image producing means of said first video link, or a different one of said images produced by said optical means in response to said three optical signals.

6. A color television system such as described in claim 5, including optical means for causing said three optical signals representative of said three color components to be projected through optical paths having substantially the same length.

7. A color television system such as described in claim 5, including means for regulating the light intensity of said three optical signals.

8. A color television system such as described in claim 5, including means for producing a second additive mixture of the color information present in said three optical signals, and means rendering one of said three video signals, which are combined in said composite color video signal producing means representative selectively of said first additive mixture or of said second additive mixture.

9. A color television system, comprising a first video link including a scanning means for scanning an object to produce a video signal having three components representative respectively of the three primary colors, red, blue and green, means for producing first and second video signals responsive respectively to said red and blue video signal components, means for producing a third video signal representative of an additive mixture of said red, blue and green color components of said video signal, and three image producing means for respectively producing monochromatic images in response to said first, second and third video signals; picture projecting means adapted to produce an optical color signal, light-splitting means for separating said optical signal into three different monochromatic optical signals representative respectively of the red, blue and green color information present in said optical signal produced in said picture projecting means, and optical means for producing three monochromatic images responsive respectively to said three optical signals; and a second video link including three scanning means for producing respective video signals, means whereby said three scanning means are selectively adapted to simultaneously scan the images of respectively different ones of said three image producing means of said first video link, or respectively different ones of said images produced by said optical means in response to said three optical signals, means for producing a composite color video signal from said respective video signals produced by said three scanning means, and means for producing a color picture image in response to said composite color video signal.

10. A color television system such as described in claim 9, including optical means for causing said three optical signals representative of said three color components to be projected through optical paths having substantially the same length.

11. A color television system such as described in claim 9, including means for regulating the light intensity of said three optical signals.

12. A color television system such as described in claim 9, including means for producing an additive mixture of the color information present in said respective video signals produced by said three scanning means to form a video signal wherein the red, blue and green color components are in the same proportion as in said third video signal of said first video link, and means for selectively coupling directly to said composite color video signal producing means said respective video signals from said three scanning means when said three scanning means are scanning the images of said first video link image producing means, and the two of said respective video signals from said three scanning means scanning the images of the two of said three image producing means responsive to said first and second video signals and said video signal formed by said last-mentioned additive mixture video signal producing means, when said three scanning means are scanning said images produced by said optical means.

References Cited in the file of this patent

UNITED STATES PATENTS

| | | |
|---|---|---|
| 2,607,845 | Clark | Aug. 19, 1952 |
| 2,612,553 | Homrighous | Sept. 30, 1952 |